US008169449B2

(12) United States Patent
Turcotte et al.

(10) Patent No.: US 8,169,449 B2

(45) Date of Patent: May 1, 2012

(54) SYSTEM COMPOSITING IMAGES FROM MULTIPLE APPLICATIONS

(75) Inventors: Garry Turcotte, Ottawa (CA); David Donohoe, Ottawa (CA); Brian Edmond, Sittsville (CA)

(73) Assignee: QNX Software Systems Limited, Ottawa, Ontario (CA)

(*) Notice: Subject to any disclaimer, the term of this patent is extended or adjusted under 35 U.S.C. 154(b) by 1073 days.

(21) Appl. No.: 12/036,909

(22) Filed: Feb. 25, 2008

(65) Prior Publication Data

US 2009/0102861 A1 Apr. 23, 2009

Related U.S. Application Data

(60) Provisional application No. 60/981,324, filed on Oct. 19, 2007.

(51) Int. Cl.

| | |
|---|---|
| ***G09G 5/00*** | (2006.01) |
| ***G06F 15/00*** | (2006.01) |
| ***G06T 1/00*** | (2006.01) |

(52) U.S. Cl. ........................................ 345/629; 345/501

(58) Field of Classification Search .................. 345/501, 345/629, 626

See application file for complete search history.

(56) References Cited

U.S. PATENT DOCUMENTS

| | | | | |
|---|---|---|---|---|
| 7,528,890 | B2 * | 5/2009 | Staker et al. | 348/592 |
| 2007/0222796 | A2 * | 9/2007 | Stotts et al. | 345/629 |
| 2009/0070673 | A1 * | 3/2009 | Barkan et al. | 715/716 |

* cited by examiner

*Primary Examiner* — Jacinta M Crawford

(74) *Attorney, Agent, or Firm* — Brinks Hofer Gilson & Lione

(57) ABSTRACT

A system for compositing images using a multilayer graphics controller includes first and second applications. The first application defines masked display regions to a layer of the multilayer graphics controller using masking criterion. The second application provides an image to a further layer of the multilayer graphics controller for display in the masked region. The image may be a still image, streaming video, Internet image, or any other image type.

25 Claims, 8 Drawing Sheets

SYSTEM COMPOSITING IMAGES FROM MULTIPLE APPLICATIONS

CROSS-REFERENCE TO RELATED APPLICATIONS

The present application claims the benefit of priority to U.S. Provisional Application No. 60/981,324, filed Oct. 19, 2007, which is hereby incorporated by reference.

BACKGROUND OF THE INVENTION

1. Technical Field

The present invention relates to a system for displaying images to a user and, more particularly, to a system compositing images from multiple, different applications.

2. Related Art

Devices that display images are used in a wide range of applications. MP3 players may display images of an artist and/or album artwork associated with its stored media content. Video players may display streaming video from a memory storage device, a private network, and/or the Internet. Cellular phones may display streaming video from a memory storage device, a private network, the Internet, and/or another cellular phone subscriber.

The user may be provided with an interface for interacting with the device. The interface may include a hardwired interface and/or a virtual interface. Hardwired interfaces may include pushbutton switches, rotary switches/potentiometers, sliders, and other mechanical based items. Virtual interfaces may be implemented using virtual buttons, virtual sliders, virtual rotator controls, function identifiers, and other visual elements on a display, such as a touchscreen display. In a combined interface, function identifiers may be placed on a display adjacent corresponding mechanical based items, such as switches.

The development of a virtual interface and/or display may become complicated when the interface must display an image and/or images from different applications. Still images and/or video images may be integrated with one another in a single application package for playback. This approach, however, limits still images and/or video playback to the images and/or video integrated with the application. Other approaches to combining images and/or video images may be complicated and require extensive use of a non-standard virtual interface development environment.

SUMMARY

A system for compositing images using a multilayer graphics controller includes first and second applications. The first application defines masked display regions to a layer of the multilayer graphics controller using masking criterion. The second application provides an image to a further layer of the multilayer graphics controller for display in the masked region. The image may be a still image, streaming video, Internet image, or any other image type.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
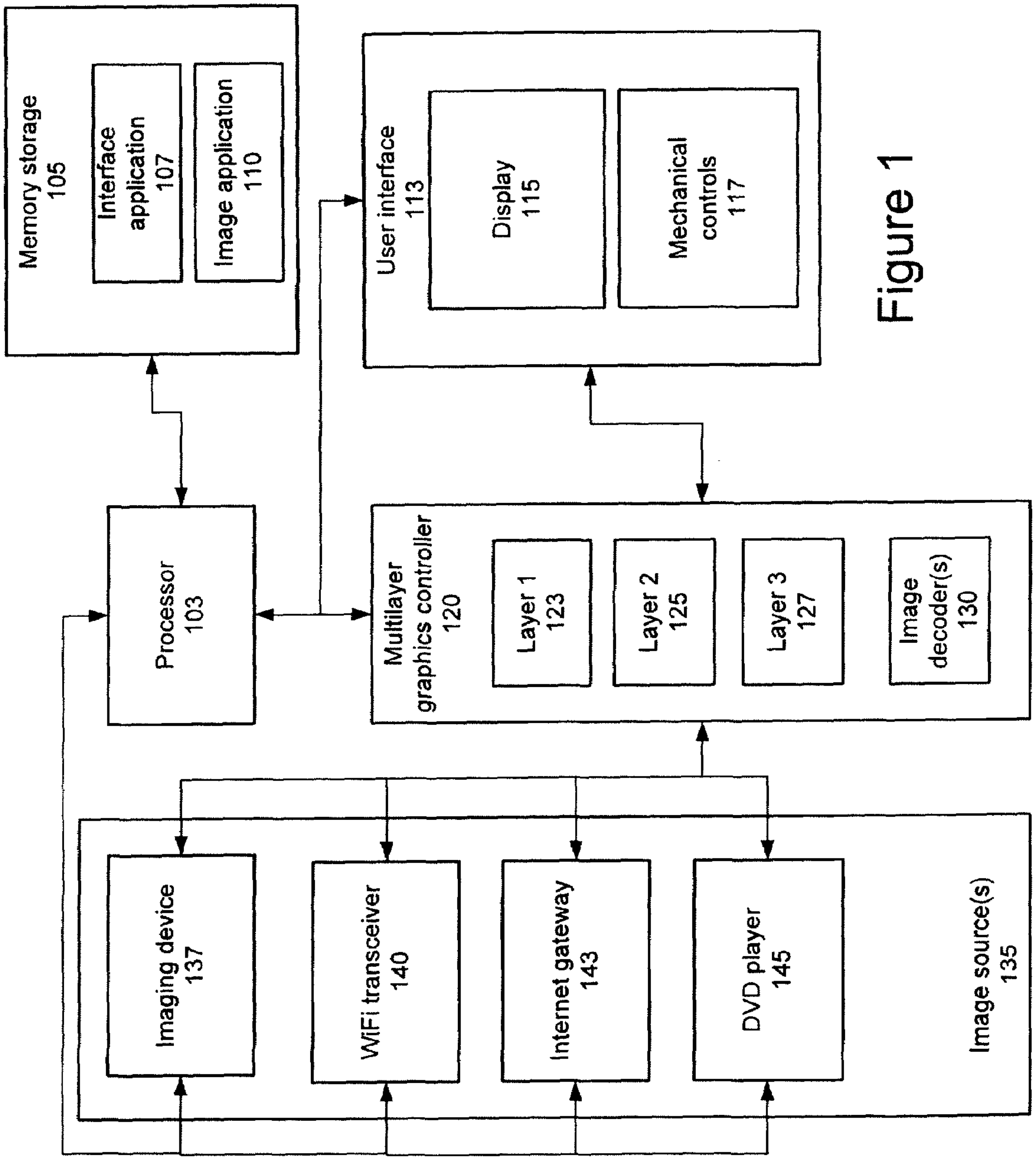
FIG. 1 is a system that composites a user interface generated by a user interface application with an image provided from an image application.

FIG. 1 shows a system 100 that composites images from multiple applications for display with one another. Although the system 100 may composite images from multiple generalized applications, system 100 of FIG. 1 implements a composited user interface. System 100 composites an image from a first application, such as a user interface application that generates one or more user interface images, with an image from a second application, such as an image provided from an image application.

System 100 includes a processor 103 that may interface with memory storage 105. Memory storage may include an interface application 107 and an image application 110. Interface application 107 is executable by the processor 103 and determines how a user interacts with system 100 through user interface 113. User interface 113 may include a display 115, such as a touchscreen display, and/or mechanical controls 117.

Display 115 may be controlled by a multilayer graphics controller 120. The multilayer graphics controller 120 may include three layers 123, 125, and 127. One or more image decoders 130, such as a DVD decoder, may also be provided. The multilayer graphics controller 120 may have the ability to show an image in a masked region of a layer based on a masking criterion. Various masking criterion may be used. System 100 may use the alpha channel value of an image in the masked region and/or the chromakey channel value of an image in the masked region.

The processor 103 may interface with various image sources 135. The image application 110 is executable by the processor 103 and may receive image information from the various image sources 135 for display using the multilayer graphics controller 120. In FIG. 1, the image sources 135 include an imaging device 137 (e.g., a still camera, a video camera, a scanner, or other image acquisition device), a WiFi transceiver 140 connected to receive images over a WiFi network, an Internet gateway 143 to obtain web page images and/or web video, and a DVD player 145 to provide images, still or video, from optical media storage.

Figure 2:
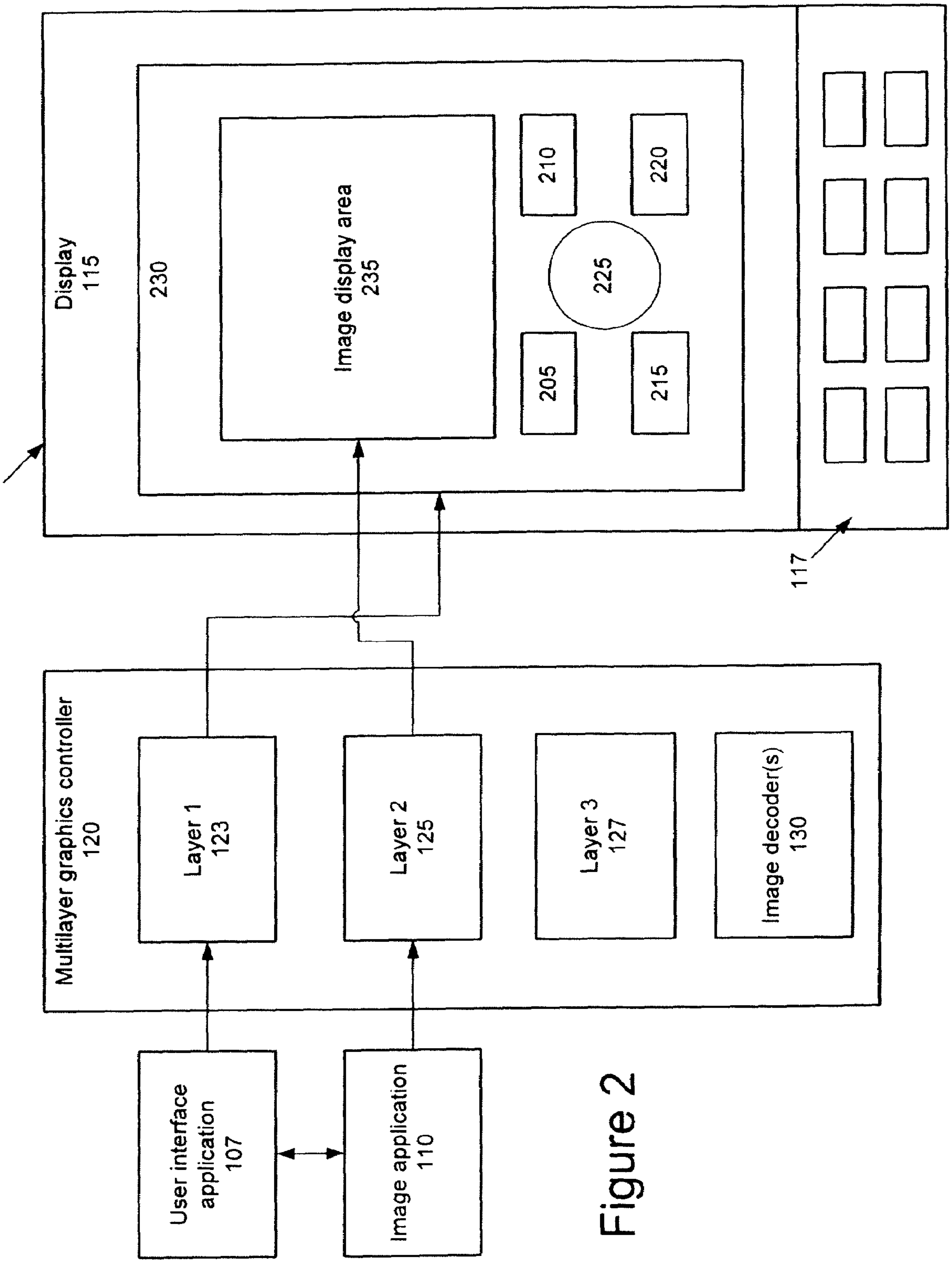
FIG. 2 is a system in which a user interface application and image application cooperate with a multilayer graphics controller and with one another to implement a user interface.

FIG. 2 illustrates how the user interface application 107 and image application 110 may cooperate with the multilayer graphics controller 120 and with one another to implement user interface 113. In FIG. 2, the user interface 113 includes display 115 and mechanical controls 117. User interface application 107 may be a vector and/or movie clip based application, such as a FLASH® player that is adapted to play an .swf file. The .swf file may include various movie clip based controls employed by the user interface 113.

The user interface application 107 may provide the movie clip based controls to the first layer 123 of the multilayer graphics controller 120. The multilayer graphics controller 120 displays these controls in the manner dictated by the user interface application 107 on display 115. In FIG. 2, the movie based clips include controls 205, 210, 215, 220, and 225. A decorative background bezel 230 may also be provided as a movie based clip.

The display 115 includes an image display area 235 for displaying images provided by the image application 110. The image display area 230 corresponds to a masked display region that may be defined by the user interface application 107 using the multilayer graphics controller 120. Image display area 230 may be a movie based clip having characteristics corresponding to masking criterion used by the multilayer graphics controller 120 for the first layer 123. For example, image display area 230 may have a color corresponding to a chromakey color mask. The image display area 230 may be a solid color, such as green or blue, although other colors may also be used. Additionally, or in the alternative, image display area 230 may have an alpha channel value corresponding to a mask.

By masking image display area 235, images on a different layer of multilayer graphics controller 120 may show through for display to the user. Image application 110 may direct the multilayer graphics controller 120 to display an image in the region of image display area 235 using a further layer of the controller 120. In FIG. 2, the image application provides the image information to the display 115 using the second layer 125 of multilayer graphics controller 120. The image information may correspond to still images, webpage data, video, or other image information.

The user interface application 107 and image application 110 may interact with one another. Manipulation of a control 205, 210, 215, 220, and/or 225 may be detected by the user interface application 107. Interface application 107 may also interpret the manipulation and direct the image application 110 to execute a corresponding operation. Additionally, or in the alternative, the image application 110 may interpret the manipulation provided by the interface application 107.

Figure 3:
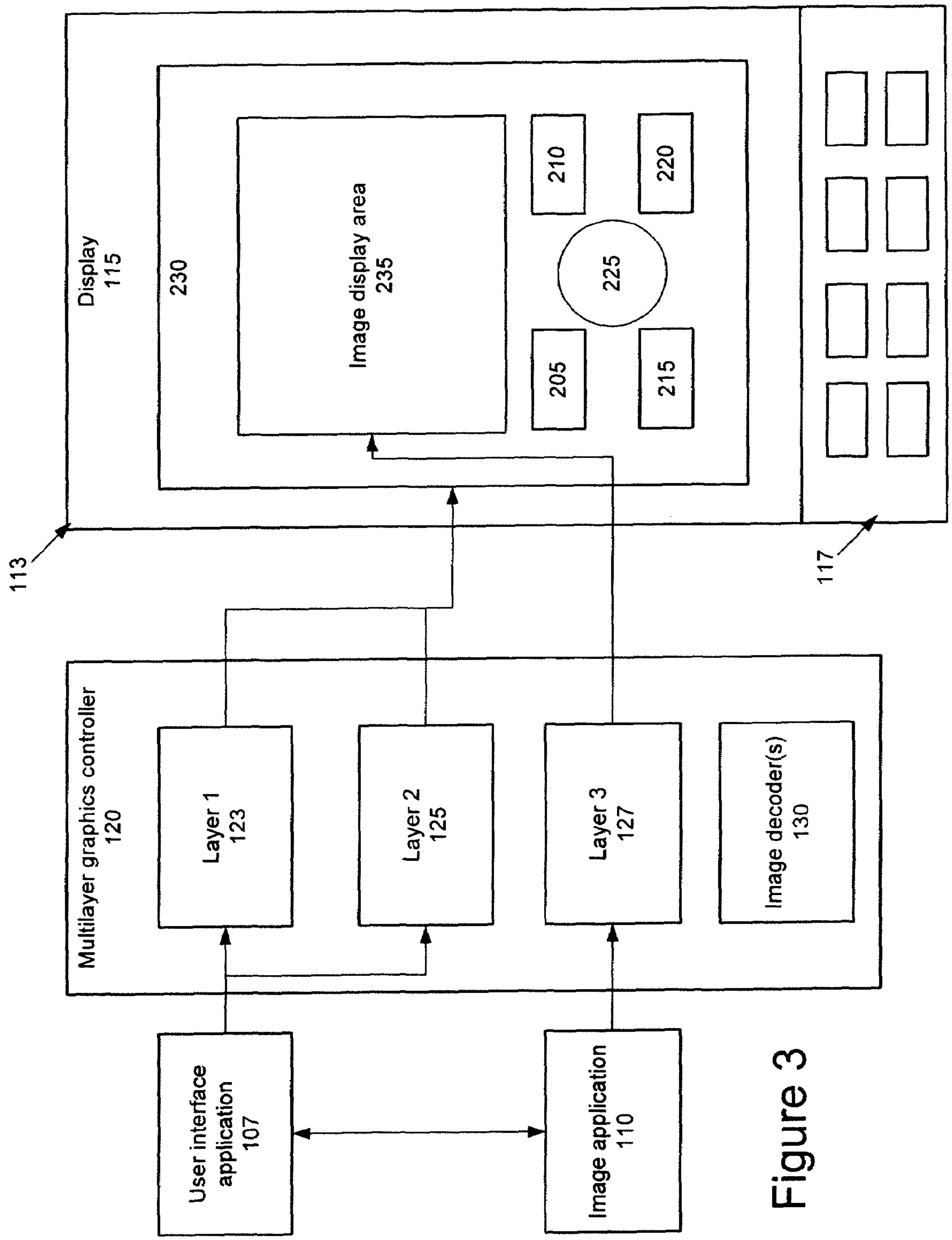
FIG. 3 is a second system in which a user interface application and image application cooperate with a multilayer graphics controller and with one another to implement a user interface.

FIG. 3 shows another manner in which the user interface application 107 and image application 110 may cooperate with the multilayer graphics controller 120 and with one another to implement user interface 113. In FIG. 3, the user interface application 107 employs multiple layers of the multilayer graphics controller 120 to display the movie clip objects of the user interface 113. The multiple layers include the first layer 123 and second layer 125. The particular distribution of the movie clip objects between the first layer 123 and second layer 125 may vary. Controls 205, 210, 215, 220, and 225 may be displayed using the first layer 123. The bezel/background 230 may be displayed using the second layer 125. Image display area 235 may be defined by the user interface application 107 using a movie clip that is displayed with the second layer 125.

Image application 110 may use the third layer 127 of the multilayer graphics controller 120 for displaying images. The graphics controller 120 may be directed by the image application 110 to display images in the image display area 235. Images provided to the third layer 127 may show through the movie clip object(s) that masks area 235 so that the images may be viewed by the user.

Figure 4:
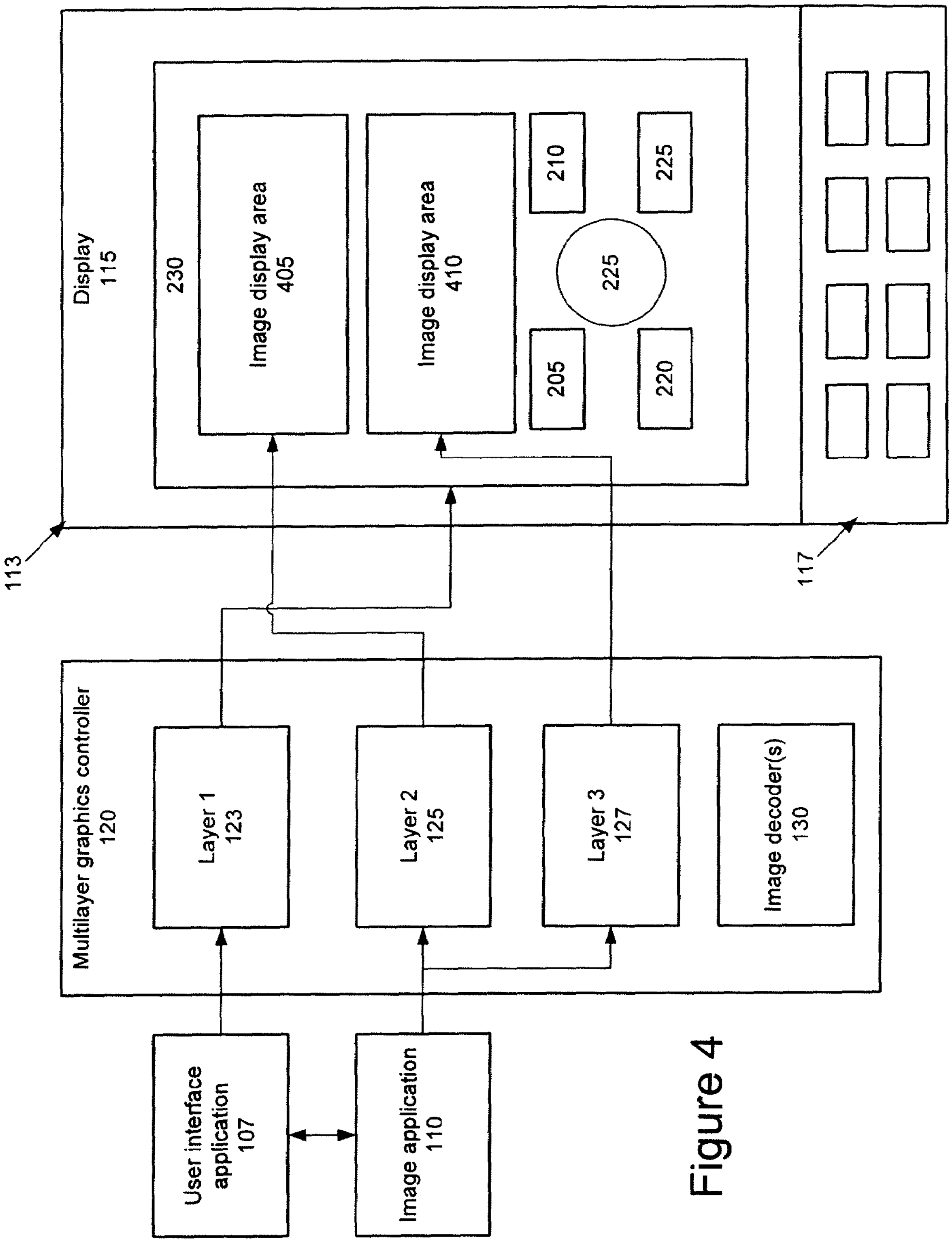
FIG. 4 is a third system in which a user interface application and image application cooperate with a multilayer graphics controller and with one another to implement a user interface.

FIG. 4 shows another manner in which the user interface application 107 and image application 110 may cooperate with the multilayer graphics controller 120 and with one another to implement user interface 113. In FIG. 4, the user interface application 107 defines two masked regions 405 and 410 for use in displaying images received by the graphics controller 120 from the image application 110. Image application 110 may use multiple layers of the graphics controller 120 to display its images. The images provided by the image application 110 to the second layer 125 may be directed for display in the region of image display area 405. The images provided by the image application 110 to the third layer 127 may be directed for display in the region of image display area 410. This configuration may be extended to further masked areas and image areas.

Figure 5:
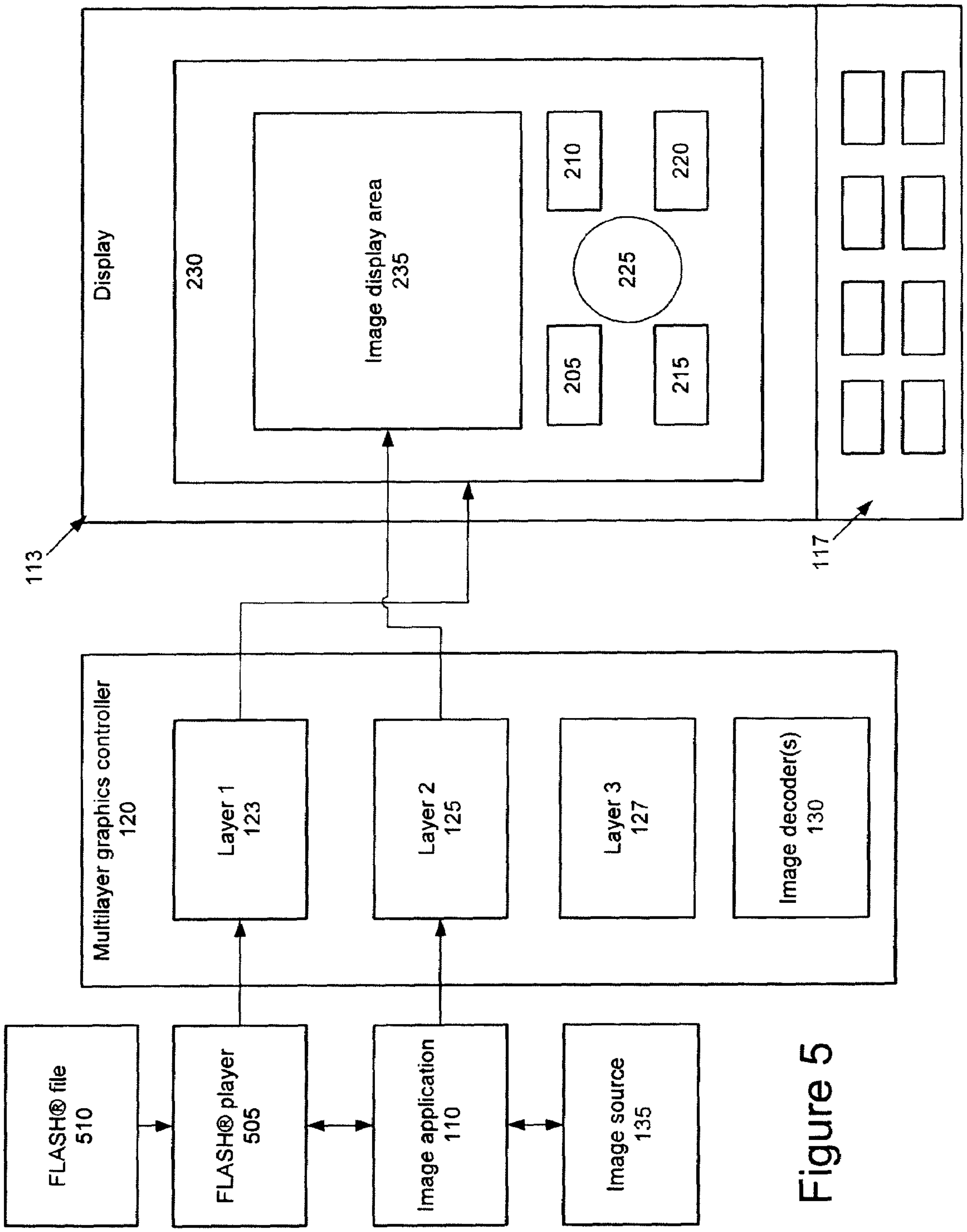
FIG. 5 is a system that implements the user interface in a FLASH® environment.

FIG. 5 shows how user interface 113 may be implemented in a FLASH® environment. In FIG. 5, a FLASH® player 505 is used to play a FLASH® file 510. The FLASH® file 510 is used to display the various movie clip objects of the user interface when it is played through the FLASH® player 505. The output of the FLASH® player 505 may be provided to the first layer 123 of the multilayer graphics controller 120 for display on the user interface 113.

The image application 110 and image type provided for display in image display area 235 may vary depending on image source 135. For example, image application 110 may include a DVD interface application that provides DVD video from a DVD player 145 (FIG. 1) for playback in image display area 235. Image application 110 may include a web-based video player for playback of video streams and/or web pages acquired through Internet gateway 143 and image display area 235. Other image applications and sources may also be used.

The user interface 113 may be changed by playing back a different FLASH® file 510. This functionality may be used to change the user interface 113 in response to changes in the image source 135 and/or image application 110. When the image source 135 is a DVD player, a FLASH® file 510 having controls corresponding to a DVD player may be used to generate the user interface 113. Controls 205, 210, 215, 220, and 225 may correspond to such functions as play, rewind, forward, reverse, volume, and other DVD player functions. When a control is manipulated by a user, its function may be interpreted by the FLASH® player 505. The FLASH® player 505 may notify the image application 110 of the function request. The image application 110 may either execute the requested function or deny its execution. If denied, the FLASH® player 505 may provide an indication of the denial to the user based on the programming in the FLASH® file 510.

Figure 6:
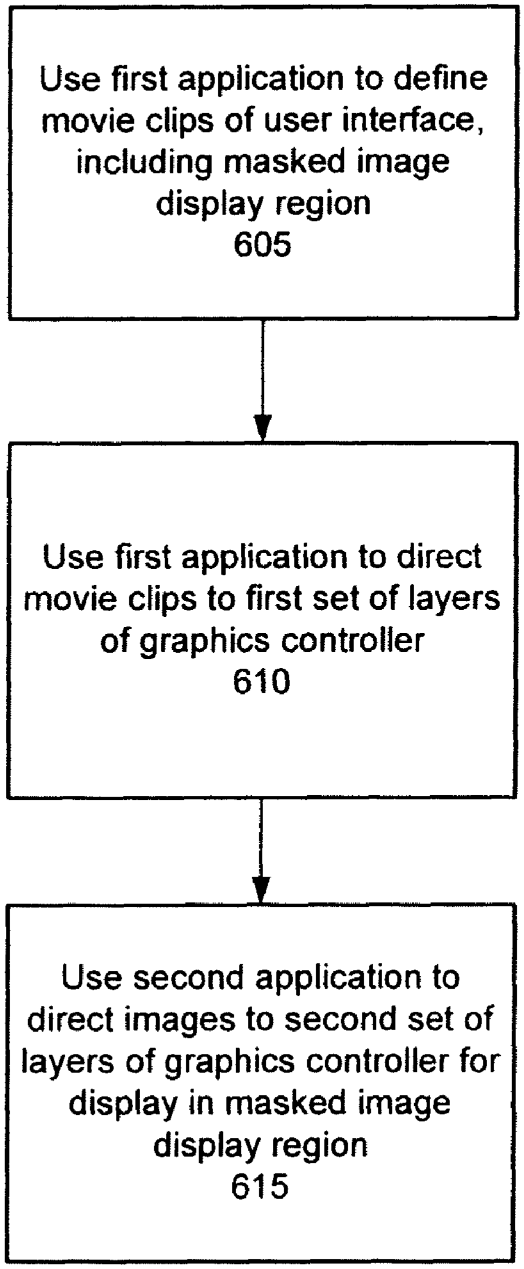
FIG. 6 is a process that may be used to implement a user interface having controls and a composited image.

FIG. 6 shows operations that may be used to implement a user interface having controls and a composited image. At 605, a first application, such as a user interface application, may be used to define movie clips of the user interface. The first application may also be used to define a masked image display region using a movie clip with a masking characteristic recognized by a multilayer graphics controller. At 610, the first application directs the multilayer graphics controller to display the movie clips using a first set of layers of the controller. A second application, such as an image application, may be used at 615 to direct images to a second set of layers of the graphics controller for display in the masked image display region.

Figure 7:
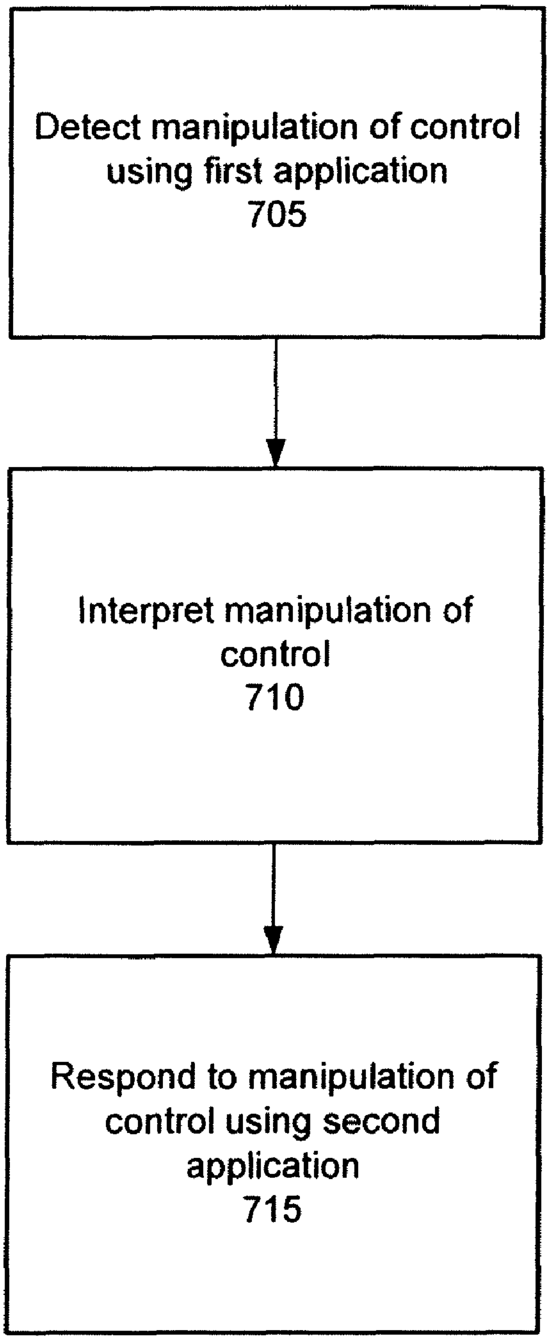
FIG. 7 is a process for responding to the manipulation of a user interface control.

FIG. 7 shows how the system 100 may respond to the manipulation of a user interface control. At 705, a first application, such as a user interface application, detects manipulation of a user interface control. At 710, the function associated with the manipulation is interpreted. This interpretation may be performed by the first application or by a second application, such as an image application. At 715, the second application responds to the manipulation of the control and executes the requested operation. Depending on the function associated with manipulation of the control, the function may also be executed by the first application or a third application.

Figure 8:
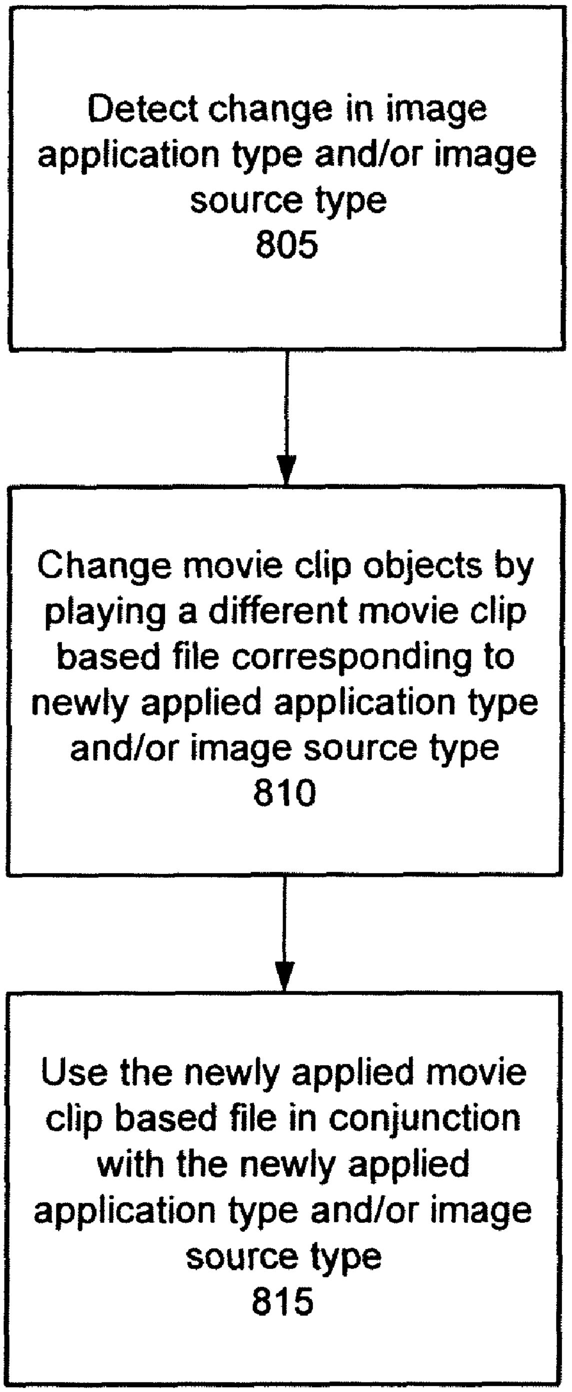
FIG. 8 is a process for changing a user interface application in response to corresponding changes of an image application type and/or image source type.

FIG. 8 shows how a user interface application may be changed in response to corresponding changes of an image application type and/or image source type. At 805, the system detects a change in the image application type and/or image source type that is used to provide images to an image display region of the user interface. The user interface application may respond to this change by changing the movie clip objects that it is currently using for the user interface. At 810, the movie clip objects may be changed by playing a different movie clip based file corresponding to the newly applied image application type and/or image source type. At 815, the newly applied movie clip based file is used in conjunction with the newly applied application type and/or image source type to implement the user interface.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for compositing images using a multilayer graphics controller having an ability to show an image in a masked region based on a masking criterion, the system comprising:
- a first application defining one or more images for display using a layer of the multilayer graphics controller, the first application further defining a masked display region using masking criterion; and
- a second application providing an image to a further layer of the multilayer graphics controller for display in the masked display region;
- wherein the multilayer graphics controller does not combine the one or more images of the first application with the image of the second application.

2. The system of claim 1, where the one or more images and masked display region of the first application comprise movie clips.

3. The system of claim 1, where the second application comprises a web-based video player.

4. The system of claim 1, where the second application comprises a DVD player application.

5. The system of claim 1, where the image provided by the second application comprises streaming video.

6. The system of claim 1, where the image provided by the second application comprises streamed Internet content.

7. The system of claim 1, where the first application comprises a FLASH® player.

8. The system of claim 1, where the masking criterion comprises an alpha channel value of the image provided by the second application.

9. The system of claim 1, where the masking criterion comprises a chromakey value of the image provided by the second application.

10. A system comprising:
- a processor;
- a display;
- a multilayer graphics controller adapted to control the display, where the multilayer graphics controller comprises an ability to show an image in a masked region of the display based on a masking criterion;
- a first application executable by the processor to define one or more movie clip based controls for display on the display using a layer of the multilayer graphics controller, where the first application further defines a masked region on the display using the masking criterion; and
- a second application executable by the processor to provide an image for display in the masked region of the display using a further layer of the multilayer graphics controller;
- wherein the multilayer graphics controller does not combine the one or more movie clip based controls defined by first application with the image provided by the second application.

11. The system of claim 10, where the masked region comprises a movie clip.

12. The system of claim 10, where the second application comprises a web-based video player, and where the one or more movie clip based controls comprises at least one control facilitating user interaction with the web-based video player.

13. The system of claim 10, where the second application comprises a DVD player application, and where the one or more clip based controls comprises at least one control facilitating user interaction with the DVD player application.

14. The system of claim 10, where the image provided by the second application comprises streaming video.

15. The system of claim 10, where the image provided by the second application comprises streamed Internet content, and where the one or more clip based controls comprises at least one control facilitating user interaction with the Internet.

16. The system of claim 10, where the first application comprises a FLASH® player.

17. The system of claim 10, where the masking criterion comprises an alpha channel value of the image provided by the second application.

18. The system of claim 10, where the masking criterion comprises a chromakey value of the image provided by the second application.

19. A non-transitory computer-readable storage medium storing:
- first application code executable to define one or more movie clip based controls for display using a layer of a multilayer graphics controller, where the first application is further executable to define a masked region on the layer using a masking criterion recognized by the multilayer graphics controller; and
- second application code executable to provide an image to a further layer of the multilayer graphics controller for display in the masked region;
- wherein the one or more movie clip controls defined by the first application code is not combined with the image provide by the second application code.

20. The non-transitory computer-readable storage medium of claim 19, where the first application comprises a FLASH® player.

21. The non-transitory computer-readable storage medium of claim 19, where the masking criterion comprises an alpha channel value of the image provided by the second application.

22. The non-transitory computer-readable storage medium of claim 19, where the masking criterion comprises a chromakey value of the image provided by the second application.

23. A method for compositing images using a multilayer graphics controller having an ability to show an image in a masked region based on a masking criterion, the system comprising:

using a first application to define one or more movie clip based controls for display using a layer of a multilayer graphics controller;

using the first application to define a movie clip based masked region on a layer of the multilayer graphics controller using masking criterion; and using a second application to provide an image to a further layer of the multilayer graphics controller for display in the masked region, wherein the image provided by the second application is displayed in the masked region without combining the image provided by the second application with the movie clip based controls defined by the first application.

24. The method of claim 23, where the first application comprises a FLASH® player.

25. The method of claim 23, where the masking criterion comprises a masking criterion selected from the group consisting of an alpha channel value of the image provided by the second application and a chromakey value of the image provided by the second application.

* * * * *

UNITED STATES PATENT AND TRADEMARK OFFICE

CERTIFICATE OF CORRECTION

PATENT NO. : 8,169,449 B2
APPLICATION NO. : 12/036909
DATED : May 1, 2012
INVENTOR(S) : Garry Turcotte et al.

It is certified that error appears in the above-identified patent and that said Letters Patent is hereby corrected as shown below:

Title Page

Left column, item (75), after "Brian Edmond," replace "Sittsville" with --Stittsville--.

In the Claims

In column 6, claim 19, line 64, before "by the second application" replace "provide" with --provided--.

Signed and Sealed this
Twenty-eighth Day of August, 2012

David J. Kappos
*Director of the United States Patent and Trademark Office*